United States Patent
Lee et al.

(10) Patent No.: US 11,254,801 B2
(45) Date of Patent: *Feb. 22, 2022

(54) MODIFIED POLYMERIZATION INITIATOR AND MODIFIED CONJUGATED DIENE-BASED POLYMER INCLUDING FUNCTIONAL GROUP DERIVED THEREFROM

(71) Applicant: LG Chem, Ltd., Seoul (KR)

(72) Inventors: Jung Yong Lee, Daejeon (KR); Jae Hoon Choe, Daejeon (KR); Dong Cheol Choe, Daejeon (KR); Jong Young Choi, Daejeon (KR); Won Jae Lee, Daejeon (KR); Hyeon Hui Kim, Daejeon (KR)

(73) Assignee: LG Chem, Ltd.

(*) Notice: Subject to any disclaimer, the term of this patent is extended or adjusted under 35 U.S.C. 154(b) by 322 days.

This patent is subject to a terminal disclaimer.

(21) Appl. No.: 16/483,235

(22) PCT Filed: Aug. 21, 2018

(86) PCT No.: PCT/KR2018/009600
§ 371 (c)(1),
(2) Date: Aug. 2, 2019

(87) PCT Pub. No.: WO2019/039835
PCT Pub. Date: Feb. 28, 2019

(65) Prior Publication Data
US 2019/0375912 A1    Dec. 12, 2019

(30) Foreign Application Priority Data

Aug. 24, 2017  (KR) .................. 10-2017-0107466
Aug. 13, 2018  (KR) .................. 10-2018-0094472

(51) Int. Cl.
| | | |
|---|---|---|
| C08K 5/17 | (2006.01) | |
| C08F 2/44 | (2006.01) | |
| C08F 36/06 | (2006.01) | |
| C08K 5/06 | (2006.01) | |
| C08K 5/09 | (2006.01) | |
| C08K 5/372 | (2006.01) | |
| C08F 36/08 | (2006.01) | |
| C08F 236/10 | (2006.01) | |

(52) U.S. Cl.
CPC .............. C08K 5/17 (2013.01); C08F 2/44 (2013.01); C08F 36/06 (2013.01); C08K 5/06 (2013.01); C08K 5/09 (2013.01); C08K 5/372 (2013.01); C08F 36/08 (2013.01); C08F 236/10 (2013.01)

(58) Field of Classification Search
None
See application file for complete search history.

(56) References Cited

U.S. PATENT DOCUMENTS

| | | | |
|---|---|---|---|
| 4,397,994 A | 8/1983 | Takeuchi et al. | |
| 5,491,230 A | 2/1996 | Lawson et al. | |
| 6,133,388 A * | 10/2000 | Lee .................. | C08C 19/44 526/180 |
| 7,767,774 B2 * | 8/2010 | Suzuki ............... | C08C 19/44 526/194 |
| 2008/0033110 A1 | 2/2008 | Suzuki et al. | |
| 2013/0172458 A1 | 7/2013 | Uesaka | |
| 2014/0213721 A1 | 7/2014 | Yamada et al. | |
| 2016/0159957 A1 | 6/2016 | Choi et al. | |
| 2018/0056716 A1 | 3/2018 | Lee et al. | |
| 2020/0079797 A1 * | 3/2020 | Lee ..................... | C08F 4/48 |

FOREIGN PATENT DOCUMENTS

| | | | | |
|---|---|---|---|---|
| CN | 1266067 A | 9/2000 | | |
| CN | 1961011 A | 5/2007 | | |
| EP | 2754674 A1 | 7/2014 | | |
| EP | 3070105 A1 * | 9/2016 | ............. | C08C 19/25 |
| EP | 3255052 A1 * | 12/2017 | ............... | B60C 1/00 |
| JP | 3748277 B2 | 2/2006 | | |
| JP | 2013108035 A | 6/2013 | | |
| JP | 2014051613 A | 3/2014 | | |
| JP | 2016527359 A | 9/2016 | | |
| KR | 20140028132 A | 3/2014 | | |
| KR | 20150056484 A | 5/2015 | | |
| KR | 20170051368 A | 5/2017 | | |
| WO | 2013035589 A1 | 3/2013 | | |
| WO | 2015072781 A1 | 5/2015 | | |
| WO | 2017078408 A1 | 5/2017 | | |

OTHER PUBLICATIONS

International Search Report for PCT/KR2018/009600 dated Mar. 7, 2019.
Search Report from Chinese Office Action for Application No. 201880010753.7 dated Aug. 27, 2020; 3 pages.
Extended European Search Report including Written Opinion for Application No. EP18847858 dated Jan. 31, 2020.
Kiyoshi Honda et al: "Stereocontrolled Elongation of a Functionalized Isoprene Unit on the E or Z Terminal Methyl of Terpenoids via N-Ylide Rearrangement of the Common Ammonium Salts" Received Feb. 1, 1996, pp. 385-386, XP055660308.
Kiyoshi Honda et al: "Stereocontrolled synthesis of acyclic terpenoids via N-ylide [2,3] rearrangement of ammonium salts with the stereodefined isoprene unit", Royal Chemical Society, Journal, Perkin Transactions 1, No. 11, May 2, 2002, pp. 1387-1396, XP055660233.

* cited by examiner

Primary Examiner — Satya B Sastri
(74) Attorney, Agent, or Firm — Lerner, David, Littenberg, Krumholz & Mentlik, LLP

(57) ABSTRACT

The present invention relates to a modified polymerization initiator for a conjugated diene-based polymer, and a modified conjugated diene-based polymer including a functional group derived from the modified polymerization initiator.

7 Claims, No Drawings

MODIFIED POLYMERIZATION INITIATOR AND MODIFIED CONJUGATED DIENE-BASED POLYMER INCLUDING FUNCTIONAL GROUP DERIVED THEREFROM

CROSS-REFERENCE TO RELATED APPLICATIONS

The present application is a national phase entry under 35 U.S.C. § 371 of International Application No. PCT/KR2018/009600, filed on Aug. 21, 2018, which claims priority from Korean Patent Application Nos. 10-2017-0107466, filed on Aug. 24, 2017, and 10-2018-0094472, filed on Aug. 13, 2018, the disclosures of which are incorporated herein by reference.

TECHNICAL FIELD

The present invention relates to a modified polymerization initiator and a modified conjugated diene-based polymer including a functional group derived therefrom.

BACKGROUND ART

According to the recent demand for cars having a low fuel consumption ratio, a conjugated diene-based polymer having modulational stability represented by wet skid resistance as well as low rolling resistance, and excellent abrasion resistance and tensile properties is required as a rubber material for tires.

In order to reduce the rolling resistance of tires, there is a method of reducing hysteresis loss of vulcanized rubber, and rebound resilience at 50° C. to 80° C., tan 5, Goodrich heating, or the like is used as an evaluation index of the vulcanized rubber. That is, it is desirable to use a rubber material having high rebound resilience at the above temperature or a low tan 5 value or Goodrich heating.

Natural rubbers, polyisoprene rubbers, or polybutadiene rubbers are known as rubber materials having low hysteresis loss, but these rubbers have a limitation of low wet skid resistance. Thus, recently, conjugated diene-based polymers or copolymers such as styrene-butadiene rubbers (hereinafter, referred to as "SBR") and butadiene rubbers (hereinafter, referred to as "BR"), are prepared by emulsion polymerization or solution polymerization to be used as rubbers for tires. Among these polymerization methods, the greatest advantage of the solution polymerization in comparison to the emulsion polymerization is that the vinyl structure content and the styrene content, which specify physical properties of the rubber, may be arbitrarily adjusted and its molecular weight and physical properties may be controlled by coupling or modification. Thus, the SBR prepared by the solution polymerization is widely used as a rubber material for tires because it is easy to change a structure of the finally prepared SBR or BR, and movement of chain terminals may be reduced and a coupling force with a filler such as silica and carbon black may be increased by coupling or modification of the chain terminals.

If the solution-polymerized SBR is used as the rubber material for tires, since a glass transition temperature of the rubber is increased by increasing the vinyl content in the SBR, physical properties such as running resistance and braking force, required for tires may be controlled, and fuel consumption may also be reduced by appropriately adjusting the glass transition temperature. The solution-polymerized SBR is prepared by using an anionic polymerization initiator and is being used by coupling or modifying the chain terminals of the polymer thus formed using various modifiers. For example, U.S. Pat. No. 4,397,994 discloses a method of coupling active anions of the chain terminals of a polymer obtained by polymerizing styrene-butadiene using alkyllithium which is a monofunctional initiator in a non-polar solvent, using a binder such as a tin compound.

Meanwhile, a solution-polymerized SSBR is prepared using an anionic polymerization initiator, and in this case, the anionic polymerization initiator is mostly an organolithium compound. The organolithium compound is used as it is or after modifying with a functional group-containing compound which may impart a polymer chain with the functional group. For example, there is a method of preparing and using a modified polymerization initiator having a styrene-based structure unit, a conjugated diene-based structure unit or an arylamine structure unit through the reaction of a styrene-based compound, a conjugated diene-based compound or an arylamine compound with an organolithium compound, but this method is economically infeasible and there is a limit to industrial use. Particularly, the production of the modified polymerization initiator using the conjugated diene-based compound is difficult because the coupling of the functional group to a conjugated diene-based unit is unfavorable.

For example, JP 3748277 discloses an anionic polymerization initiator prepared by reacting an adduct obtained by bonding the nitrogen of a cyclic secondary amine to conjugated diene carbon, with an organolithium compound. However, according to the reaction, the cyclic secondary amine may remain and act as a scavenger during the reaction, and the yield of the anionic polymerization initiator may be degraded. Accordingly, filtering and separating processes are essentially required after the reaction. Therefore, the development of a modified polymerization initiator having excellent economic feasibility and industrial applicability is required.

DISCLOSURE OF THE INVENTION

Technical Problem

The present invention has been devised to solve the above-mentioned problems of the conventional technique, and an object of the present invention is to provide a modified polymerization initiator, which may easily initiate the reaction and provide a functional group to a polymer.

Also, another object of the present invention is to provide a modified conjugated diene-based polymer with excellent processability, tensile strength, abrasion resistance, rolling resistance and wet skid resistance by including a derived unit of the modified polymerization initiator.

Technical Solution

To solve the above-described tasks, according to an embodiment of the present invention, there is provided a modified polymerization initiator including one or more units derived from a compound represented by the following Formula 1, and a unit derived from a compound represented by the following Formula 2:

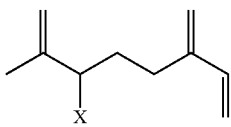
[Formula 1]

In Formula 1,

X is —NR$_a$R$_b$, —OR$_c$, or —SR$_d$, and

R$_a$ to R$_d$ are each independently an alkyl group of 1 to 30 carbon atoms, an alkenyl group of 2 to 30 carbon atoms, an alkynyl group of 2 to 30 carbon atoms, a cycloalkyl group of 3 to 30 carbon atoms, an aryl group of 6 to 30 carbon atoms, a heteroalkyl group of 1 to 30 carbon atoms, a heteroalkenyl group of 2 to 30 carbon atoms, a heteroalkynyl group of 2 to 30 carbon atoms, a heterocycloalkyl group of 2 to 30 carbon atoms, or a heteroaryl group of 3 to 30 carbon atoms, where each of R$_a$ to R$_d$ is unsubstituted or substituted with a substituent including one or more heteroatoms selected from N, O, S, Si and F atoms, and R$_a$ and R$_b$ may be connected with each other to form an aliphatic hydrocarbon ring of 5 to carbon atoms, an aromatic hydrocarbon ring of 6 to 20 carbon atoms, or a heterocycle of 3 to 20 carbon atoms, which are unsubstituted or substituted with an alkyl group of 1 to 30 carbon atoms, M-R$_1$                                         [Formula 2]

In Formula 2,

M is an alkali metal, and

R$_1$ is hydrogen, an alkyl group of 1 to 30 carbon atoms, an alkenyl group of 2 to 30 carbon atoms, an alkynyl group of 2 to 30 carbon atoms, a cycloalkyl group of 5 to 30 carbon atoms, or an aryl group of 6 to 30 carbon atoms.

In addition, the present invention provides a modified conjugated diene-based polymer including a functional group derived from the modified polymerization initiator.

Advantageous Effects

The modified polymerization initiator according to the present invention includes a unit derived from a compound represented by Formula 1 and may include diverse functional groups in a molecule, and thus, may initiate a polymerization reaction and introduce a functional group in a polymer chain at the same time.

In addition, the modified conjugated diene-based polymer according to the present invention is prepared in the presence of the modified polymerization initiator, and may include a functional group derived from the modified polymerization initiator in at least one terminal thereof, and accordingly, the affinity thereof with a filler may be excellent, the compounding properties thereof may be improved, and as a result, processability is excellent, effects of excellent tensile strength, abrasion resistance, rolling resistance and wet skid resistance may be achieved.

BEST MODE FOR CARRYING OUT THE INVENTION

Hereinafter, the present invention will be described in more detail in order to assist the understanding of the present invention.

It will be understood that words or terms used in the description and claims of the present invention shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

The term "substituted" used in the present invention may mean the hydrogen of a functional group, an atomic group or a compound is substituted with a specific substituent. If the hydrogen of a functional group, an atomic group or a compound is substituted with a specific substituent, one or a plurality including two or more of substituents may be present according to the number of hydrogen present in the functional group, the atomic group or the compound, and if a plurality of substituents are present, each substituent may be the same or different.

The term "alkyl group" used in the present invention may mean monovalent aliphatic saturated hydrocarbon, and may include both linear alkyl groups such as methyl, ethyl, propyl and butyl, and branched alkyl groups such as isopropyl, sec-butyl, tert-butyl and neo-pentyl.

The term "alkylene group" used in the present invention may mean divalent aliphatic saturated hydrocarbon such as methylene, ethylene, propylene and butylene.

The term "alkenyl group" used in the present invention may mean an alkyl group including one or two or more double bonds.

The term "alkynyl group" used in the present invention may mean an alkyl group including one or two or more triple bonds.

The term "cycloalkyl group" used in the present invention may mean cyclic saturated hydrocarbon.

The term "aryl group" used in the present invention may mean cyclic aromatic hydrocarbon, and may include both monocyclic aromatic hydrocarbon including one ring, and polycyclic aromatic hydrocarbon including two or more bonded rings.

The term "heteroalkyl group" used in the present invention may mean an alkyl group, in which a carbon atom (excluding a terminal carbon atom) in the alkyl group is substituted with one or more heteroatoms.

The term "heteroalkenyl group" used in the present invention may mean an alkenyl group, in which a carbon atom (excluding a terminal carbon atom) in the alkenyl group is substituted with one or more heteroatoms.

The term "heteroalkynyl group" used in the present invention may mean an alkynyl group, in which a carbon atom (excluding a terminal carbon atom) in the alkynyl group is substituted with one or more heteroatoms.

The term "heterocycloalkyl group" used in the present invention may mean a cycloalkyl group, in which a carbon atom in the cycloalkyl group is substituted with one or more heteroatoms.

The term "heteroaryl group" used in the present invention may mean a aryl group, in which a carbon atom in the aryl group is substituted with one or more heteroatoms.

The term "derived unit" and "derived functional group" used in the present invention may represent a component or a structure comes from a certain material, or the material itself.

The present invention provides a modified polymerization initiator that may act as a polymerization initiator during polymerizing a polymer, specifically, a conjugated diene-based polymer, and may provide a functional group.

The modified polymerization initiator according to an embodiment of the present invention is characterized in including one or more units derived from a compound represented by the following Formula 1 and a unit derived from a compound represented by the following Formula 2:

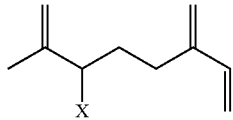

[Formula 1]

In Formula 1,

X is —$NR_aR_b$, —$OR_c$, or —$SR_d$, and $R_a$ to $R_d$ are each independently an alkyl group of 1 to 30 carbon atoms, an alkenyl group of 2 to 30 carbon atoms, an alkynyl group of 2 to 30 carbon atoms, a cycloalkyl group of 3 to 30 carbon atoms, an aryl group of 6 to 30 carbon atoms, a heteroalkyl group of 1 to 30 carbon atoms, a heteroalkenyl group of 2 to 30 carbon atoms, a heteroalkynyl group of 2 to 30 carbon atoms, a heterocycloalkyl group of 2 to 30 carbon atoms, or a heteroaryl group of 3 to 30 carbon atoms, where each of $R_a$ to $R_d$ is unsubstituted or substituted with a substituent including one or more heteroatoms selected from N, O, S, Si and F atoms, and $R_a$ and $R_b$ may be connected with each other to form an aliphatic hydrocarbon ring of 5 to carbon atoms, an aromatic hydrocarbon ring of 6 to 20 carbon atoms, or a heterocycle of 3 to 20 carbon atoms, which are unsubstituted or substituted with an alkyl group of 1 to 30 carbon atoms, M-$R_1$ [Formula 2]

In Formula 2,

M is an alkali metal, and $R_1$ is hydrogen, an alkyl group of 1 to 30 carbon atoms, an alkenyl group of 2 to 30 carbon atoms, an alkynyl group of 2 to 30 carbon atoms, a cycloalkyl group of 5 to 30 carbon atoms, or an aryl group of 6 to 30 carbon atoms.

Particularly, in Formula 1, X is —$NR_aR_b$, —$OR_a$, or —$SR_d$, and $R_a$ to $R_d$ are each independently an alkyl group of 1 to 20 carbon atoms, an alkenyl group of 2 to 20 carbon atoms, an alkynyl group of 2 to 20 carbon atoms, a cycloalkyl group of 3 to 20 carbon atoms, an aryl group of 6 to 20 carbon atoms, a heteroalkyl group of 1 to 20 carbon atoms, a heteroalkenyl group of 2 to 20 carbon atoms, a heteroalkynyl group of 2 to 20 carbon atoms, a heterocycloalkyl group of 2 to 20 carbon atoms, or a heteroaryl group of 3 to 20 carbon atoms, where each of $R_a$ to $R_d$ is unsubstituted or substituted with a substituent including one or more heteroatoms selected from N, O, S, Si and F atoms, and $R_a$ and $R_b$ may be connected with each other to form an aliphatic hydrocarbon ring of 5 to 20 carbon atoms, an aromatic hydrocarbon ring of 6 to 20 carbon atoms, or a heterocycle of 3 to 20 carbon atoms, which are unsubstituted or substituted with an alkyl group of 1 to 20 carbon atoms.

In addition, more particularly, in Formula 1, X may be selected from the substituents represented by the following Formula 1a to Formula 1c:

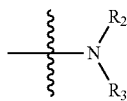

[Formula 1a]

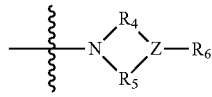

[Formula 1b]

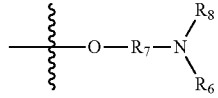

[Formula 1c]

In Formula 1a to Formula 1c, $R_2$, $R_3$, $R_6$, $R_8$ and $R_9$ are each independently an alkyl group of 1 to 10 carbon atoms, an alkenyl group of 2 to 10 carbon atoms, an alkynyl group of 2 to 10 carbon atoms, a cycloalkyl group of 3 to 10 carbon atoms, an aryl group of 6 to 10 carbon atoms, a heteroalkyl group of 1 to 10 carbon atoms, a heteroalkenyl group of 2 to 10 carbon atoms, a heteroalkynyl group of 2 to 10 carbon atoms, a heterocycloalkyl group of 3 to 10 carbon atoms, or a heteroaryl group of 3 to 10 carbon atoms, where $R_2$ and $R_3$, and $R_8$ and $R_9$ each may be connected with each other to form an aliphatic hydrocarbon ring of 5 to 20 carbon atoms, or an aromatic hydrocarbon ring of 6 to 20 carbon atoms, and each of $R_2$, $R_3$, $R_6$, $R_8$ and $R_9$ is unsubstituted or substituted with a substituent including one or more heteroatoms selected from N, O and S atoms, $R_4$, $R_5$ and $R_7$ are each independently an alkylene group of 1 to 10 carbon atoms, the alkylene group being unsubstituted or substituted with an alkyl group of 1 to 10 carbon atoms, a cycloalkyl group of 5 to 10 carbon atoms, an aryl group of 6 to 10 carbon atoms, a heteroatom selected from N and O atoms or a substituent including the heteroatom, and Z is one selected from N, O and S atoms, where if Z is O or S, $R_6$ is not present.

More particularly, the compound represented by Formula 1 may be a compound represented by the following Formula 1-1 to Formula 1-11:

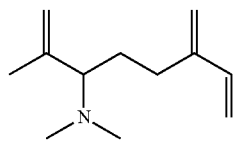

[Formula 1-1]

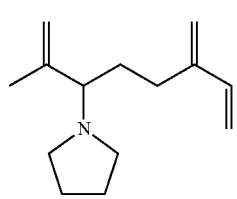

[Formula 1-2]

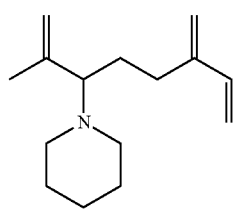

[Formula 1-3]

[Formula 1-4]

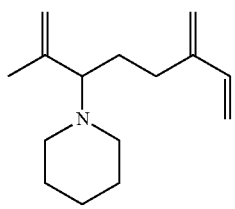

[Formula 1-5]

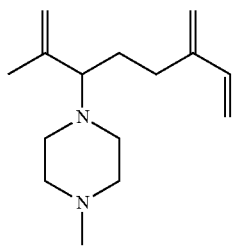

[Formula 1-6]

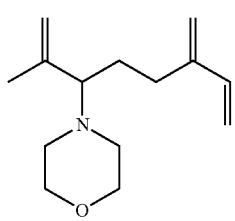

[Formula 1-7]

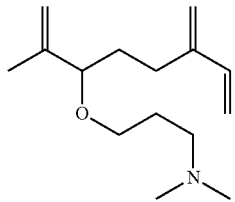

[Formula 1-8]

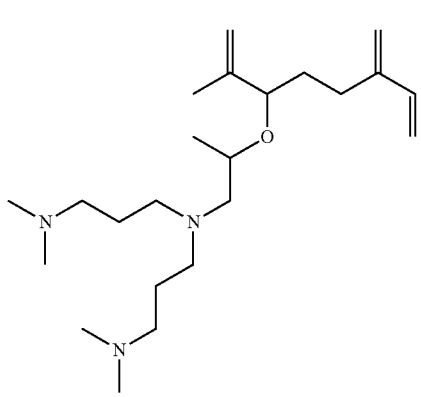

[Formula 1-9]

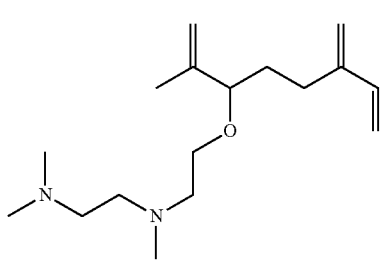

[Formula 1-10]

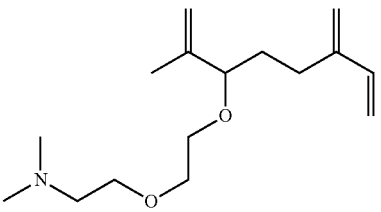

[Formula 1-11]

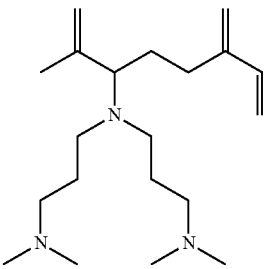

In addition, in Formula 2, M is an alkali metal, $R_1$ may be hydrogen, an alkyl group of 1 to 10 carbon atoms, an alkenyl group of 2 to 10 carbon atoms, an alkynyl group of 2 to 10 carbon atoms, a cycloalkyl group of 5 to 10 carbon atoms, or an aryl group of 6 to 10 carbon atoms.

In addition, the modified polymerization initiator according to an embodiment of the present invention may be one material or a mixture type of various materials.

Particularly, the modified polymerization initiator may include one or more selected from a compound represented by Formula 3 and the isomers thereof.

In addition, the modified polymerization initiator may include one or more selected from the dimer, the trimer or the oligomer of a compound represented by Formula 3, and the dimer, the trimer or the oligomer of the isomers of the compound represented by Formula 3.

In addition, the modified polymerization initiator according to an embodiment of the present invention may include as another embodiment, one or more selected from a compound represented by Formula 3, the isomers thereof, the dimer, the trimer or the oligomer of the compound represented by Formula 3, and the dimer, the trimer or the oligomer of the isomers.

[Formula 3]

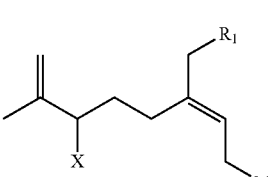

In Formula 3,

X is the same as defined in Formula 1, M is Na, K or Li, and $R_1$ is hydrogen or an alkyl group of 1 to 10 carbon atoms. In addition, in Formula 3, M may be bonded to neighboring carbon by an ionic bond.

Meanwhile, the isomers of the compound represented by Formula 3 may include both the structure isomers and the stereoisomers of the compound represented by Formula 3, for example, may be one or more selected from the compounds represented in the following Formula 3-1 to Formula 3-3:

[Formula 3-1]

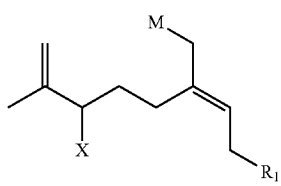

[Formula 3-2]

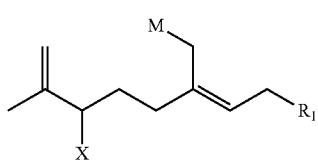

[Formula 3-3]

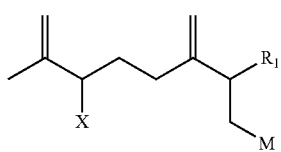

In Formula 3-1 to Formula 3-3,

X is the same as defined in Formula 1, M is Na, K or Li, and $R_1$ is hydrogen or an alkyl group of 1 to 10 carbon atoms. In addition, in Formula 3-1 to Formula 3-3, M may be bonded to neighboring carbon by an ionic bond.

More particularly, in Formula 3 and Formula 3-1 to Formula 3-3, X may be selected from the substituents represented by Formula 1a to Formula 1c, where $R_2$, $R_3$, $R_6$, $R_8$ and $R_9$ are each independently an alkyl group of 1 to 10 carbon atoms, which is unsubstituted or substituted with one or more heteroatoms selected from N, O and S atoms or a substituent including the heteroatom, $R_4$, $R_5$ and $R_7$ are each independently an alkylene group of 1 to 6 carbon atoms, which is unsubstituted or substituted with an alkyl group of 1 to 10 carbon atoms, a heteroatom selected from N and O atoms or a substituent including the heteroatom, and Z may be O.

In addition, the compound represented by Formula 3 includes the unit derived from the compound represented by Formula 1 and the unit derived from the compound represented by Formula 2. The dimer may represent a combined type of two units derived from the compound represented by Formula 1 and one unit derived from the compound represented by Formula 2, and the trimer may represent a combined type of three units derived from the compound represented by Formula 1 and one unit derived from the compound represented by Formula 2. In addition, the oligomer may represent a combined type of a plurality of the units derived from the compound represented by Formula 1 and one unit derived from the compound represented by Formula 2.

For example, the dimer of the compound represented by Formula 3 may be a compound represented by the following Formula 3-4:

[Formula 3-4]

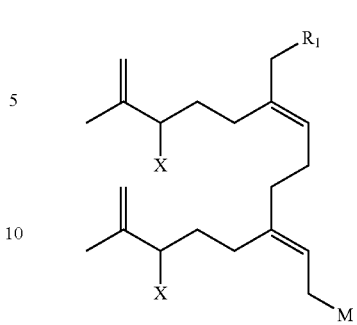

Meanwhile, the compound represented by Formula 1 according to an embodiment of the present invention may be prepared by reacting myrcene with a functional group compound. For example, as in Reaction 1 below, myrcene is reacted with a reactive compound to form a reactive site in the molecular structure of the myrcene, and then reacted with a functional group compound to form a compound represented by Formula 1, obtained by introducing a functional group derived from the functional group compound to the reactive site.

[Reaction 1]

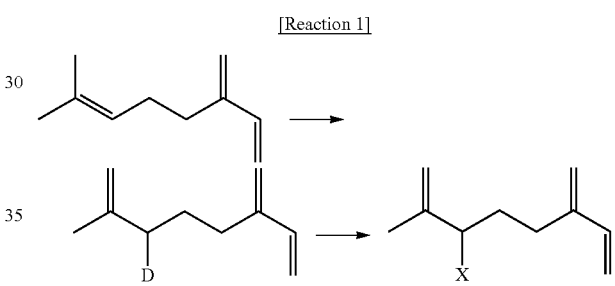

In Reaction 1, D may be Cl, Br, I or —OH, and X is the same as defined in Formula 1.

In addition, the modified polymerization initiator according to an embodiment of the present invention may be prepared by reacting the compound represented by Formula 1 and the compound represented by Formula 2.

For example, the reaction of the compound represented by Formula 1 and the compound represented by Formula 2 may be performed using a continuous type reactor or a batch type reactor, and the reaction may be performed at a temperature of −20° C. to 100° C., 0° C. to 90° C., or 15° C. to 80° C. under pressure conditions of 1 bar to 10 bar, 1 bar to 7 bar, or 1 bar to 5 bar.

In addition, the compound represented by Formula 1 and the compound represented by Formula 2 may be injected into a reactor in batches, or one by one, and may be injected into the reactor via the same injection line or each different line.

In addition, the compound represented by Formula 1 and the compound represented by Formula 2 may be reacted in a molar ratio of 1:0.01 to 5, 1:0.1 to 5, 1:0.5 to 3, or 1:0.5 to 1.5. In this case, according to the molar ratio of the compound represented by Formula 1 and the compound represented by Formula 2, the modified polymerization initiator thus prepared may have a dimer, a trimer or an oligomer type.

In addition, the reaction may be performed by using a polar additive to control the reactivity of the compound represented by Formula 1 and the compound represented by Formula 2, and the polar additive may be, for example, one or more selected from the group consisting of tetrahydrofuran, ditetrahydrofufurylpropane, diethyl ether, cycloamyl ether, dipropyl ether, ethylene dimethyl ether, diethyl glycol, dimethyl ether, tert-butoxyethoxyethane, bis(3-dimethylaminoethyl) ether, (dimethylaminoethyl) ethyl ether, trimethylamine, triethylamine, tripropylamine, and tetramethylethylenediamine, particularly, triethylamine or tetramethylethylenediamine.

Meanwhile, if the reaction is performed using the polar additive, the polar additive may be used in a molar amount of 0.1 mol to 10 mol, 0.5 mol to 5 mol, or 0.5 mol to 1.5 mol based on 1 mol of the compound represented by Formula 1.

In addition, the present invention provides a modified conjugated diene-based polymer including a functional group derived from the modified polymerization initiator.

The modified conjugated diene-based polymer according to an embodiment of the present invention includes a repeating unit derived from a conjugated diene-based monomer, and a functional group derived from the modified polymerization initiator including one or more units derived from a compound represented by the following Formula 1 and a unit derived from a compound represented by the following Formula 2, in at least one terminal:

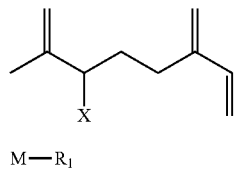

[Formula 1]

M—R$_1$ [Formula 2]

In Formula 1 or Formula 2, X, M and R$_1$ are the same as defined in the explanation on the modified polymerization initiator.

The repeating unit derived from the conjugated diene-based monomer may mean a repeating unit formed by the conjugated diene-based monomer during polymerization, and the conjugated diene-based monomer may be, for example, one or more selected from the group consisting of 1,3-butadiene, 2,3-dimethyl-1,3-butadiene, piperylene, 3-butyl-1,3-octadiene, isoprene, 2-phenyl-1,3-butadiene, and 2-halo-1,3-butadiene (halo means a halogen atom).

Meanwhile, a modified conjugated diene-based copolymer may be, for example, a copolymer further including a repeating unit derived from an aromatic vinyl monomer together with the repeating unit derived from the conjugated diene-based monomer.

The repeating unit derived from the aromatic vinyl monomer may mean a repeating unit formed by an aromatic vinyl monomer during polymerization, and the aromatic vinyl monomer may include, for example, one or more selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl) styrene, and 1-vinyl-5-hexylnaphthalene.

According to an embodiment of the present invention, the copolymer may be a random copolymer, and in this case, the balance among each of the physical properties is excellent. The random copolymer may mean a copolymer of which constituting repeating units are arranged in disorder.

In addition, the modified conjugated diene-based polymer may be prepared by a preparation method including a step of preparing an active polymer combined with an alkali metal by polymerizing a conjugated diene-based monomer, or a conjugated diene-based monomer and an aromatic vinyl monomer in the presence of a polymerization initiator including a unit derived from the compound represented by Formula 1 and a unit derived from the compound represented by Formula 2, in a hydrocarbon solvent.

The hydrocarbon solvent is not specifically limited, but may be, for example, one or more selected from the group consisting of n-pentane, n-hexane, n-heptane, isooctane, cyclohexane, toluene, benzene and xylene.

The conjugated diene-based monomer and the aromatic vinyl monomer are the same as defined above.

The polymerization may be performed by including a polar additive, and the polar additive may be added in an amount of 0.001 g to 50 g, 0.001 g to 10 g, or 0.005 g to 0.1 g based on total 100 g of the monomer. In addition, the polar additive may be one or more selected from the group consisting of tetrahydrofuran, ditetrahydrofurylpropane, diethyl ether, cycloamyl ether, dipropyl ether, ethylene dimethyl ether, diethyl glycol, dimethyl ether, tert-butoxyethoxyethane, bis(3-dimethylaminoethyl) ether, (dimethylaminoethyl) ethyl ether, trimethylamine, triethylamine, tripropylamine, and tetramethylethylenediamine, particularly, triethylamine or tetramethylethylenediamine, and may be the same as or different from the polar additive which may be used for preparing the polymerization initiator. If the polar additive is included and a conjugated diene-based monomer, or a conjugated diene-based monomer and an aromatic vinyl-based monomer are copolymerized, the difference of the reaction rates thereof may be compensated, and effect of inducing the easy formation of a random copolymer may be achieved.

The polymerization of step 1 may be, for example, an anionic polymerization, and particularly, a living anionic polymerization by which an anionic active part is formed at the polymerization terminal through a propagation reaction by anions. In addition, the polymerization of step 1 may be a polymerization with heating, an isothermal polymerization, or a polymerization at a constant temperature (adiabatic polymerization). The polymerization at a constant temperature means a polymerization method including a step of polymerizing using self-generated heat of reaction without optionally applying heat after adding an organometal compound, and the polymerization with heating means a polymerization method including injecting the organometal compound and then, increasing the temperature by optionally applying heat. The isothermal polymerization means a polymerization method by which the temperature of a polymer is kept constant by increasing heat by applying heat or taking heat after adding the organometal compound.

In addition, the polymerization of step 1 may be performed in a temperature range of −20° C. to 200° C., 0° C. to 150° C., or 10° C. to 120° C.

In addition, the method for preparing a modified conjugated diene-based polymer may be performed by a batch type polymerization method or a continuous type polymerization method including one or more reactors.

Hereinafter, the present invention will be explained in more detail referring to embodiments. However, the following embodiments are only for the illustration of the present invention, and the scope of the present invention is not limited thereto.

EXAMPLES

Example 1

To a vacuum dried batch type reactor, 15 ml of hexane, 1.2 ml (7.4 mmol) of tetramethylethylenediamine, and 1.5 ml (3.7 mmol) of 2.5 M n-butyl lithium were injected and mixed for 1 minute under nitrogen stream. 0.67 g (3.7 mmol) of a compound represented by Formula 1-1 below was injected thereto, followed by stirring at 50° C. for 5 minutes to prepare a modified polymerization initiator. The modified polymerization initiator thus prepared was a mixture in which isomer compounds represented by Formulae (x) to (xiii) coexisted. The synthesis of the modified polymerization initiator thus prepared was secured by the change of the molecular weights of the compound represented by Formula 1-1 and the finally obtained material by molecular analysis. The molecular weight of the compound represented by Formula 1-1 was 179 g/mol, and the molecular weight of the finally obtained material, i.e., the modified polymerization initiator was 237 g/mol. In this case, the molecular weight of the modified polymerization initiator represented the molecular weight obtained by substituting Li with H.

Particularly, the molecular weight analysis was conducted by GC/Mass analysis. In this case, a column used was ZB-5MS (0.25 mm (ID)×30 ml, 0.25 μm d.f. capillary), a gas flow rate (column (He)) was 1 ml/min, the temperature of an oven was elevated after 3 minutes from an initial temperature of 50° C. by 10° C./min rate to 320° C. and was kept for 15 minutes, the temperature of an inlet was 250° C., a split ratio was 1/20, and an injection amount was controlled to 0.2 μl. In addition, the measurement was conducted after protonating the organolithium part of the modified polymerization initiator by quenching.

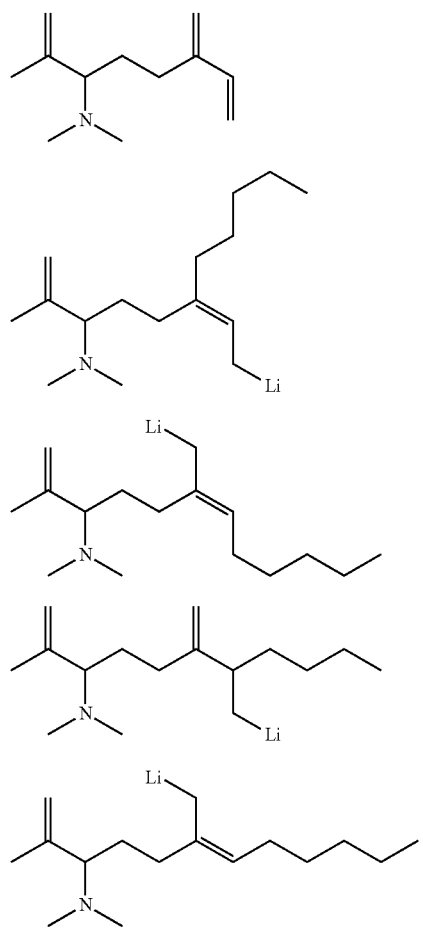

Example 2

To a vacuum dried batch type reactor, 15 ml of hexane, 0.6 ml (3.7 mmol) of tetramethylethylenediamine, and 1.5 ml (3.7 mmol) of 2.5 M n-butyllithium were injected and mixed for 1 minute under nitrogen stream. 0.67 g (3.7 mmol) of a compound represented by Formula 1-1 below was injected thereto, followed by stirring at 20° C. for 5 minutes to prepare a modified polymerization initiator. The modified polymerization initiator thus prepared was a mixture in which isomer compounds represented by Formulae (x) to (xiii) coexisted. The synthesis of the modified polymerization initiator thus prepared was secured by the change of the molecular weights of the compound represented by Formula 1-1 and the finally obtained material by molecular analysis. The molecular weight of the compound represented by Formula 1-1 was 179 g/mol, and the molecular weight of the finally obtained material, i.e., the modified polymerization initiator was 237 g/mol. In this case, the molecular weight of the modified polymerization initiator represented the molecular weight obtained by substituting Li with H, and the molecular weight analysis was conducted by the same method as in Example 1.

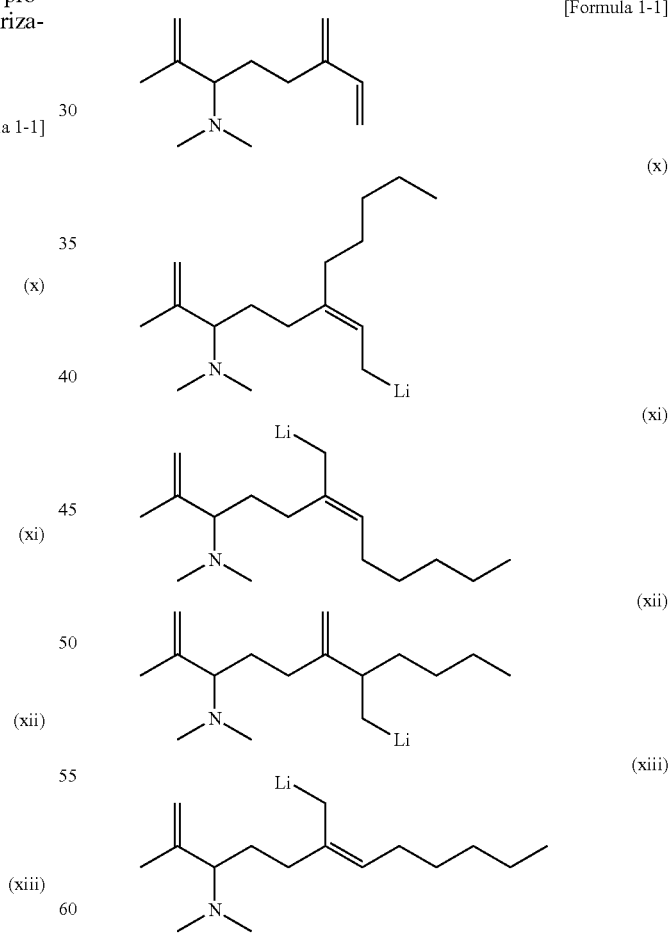

Example 3

To a vacuum dried batch type reactor, 15 ml of hexane, 0.6 ml (3.7 mmol) of tetramethylethylenediamine, and 1.5 ml (3.7 mmol) of 2.5 M n-butyllithium were injected and mixed for 1 minute under nitrogen stream. 1.33 g (7.4 mmol) of a compound represented by Formula 1-1 below was injected thereto, followed by stirring at 60° C. for 20 minutes to prepare a modified polymerization initiator. The modified polymerization initiator thus prepared was a mixture in which isomer compounds of a dimer type obtained by combining two units derived from the compound represented by Formula 1-1 and one unit derived from n-butyllithium coexisted. The synthesis of the modified polymerization initiator thus prepared was secured by the change of the molecular weights of the compound represented by Formula 1-1 and the finally obtained material by molecular analysis. The molecular weight of the compound represented by Formula 1-1 was 179 g/mol, and the molecular weight of the finally obtained material, i.e., the modified polymerization initiator was 416 g/mol. In this case, the molecular weight of the modified polymerization initiator represented the molecular weight obtained by substituting Li with H, and the molecular weight analysis was conducted by the same method as in Example 1.

[Formula 1-1]

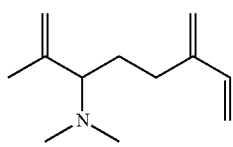

Example 4

To a vacuum dried batch type reactor, 15 ml of hexane, 1.2 ml (5.6 mmol) of tetramethylethylenediamine, and 1.5 ml (3.7 mmol) of 2.5 M n-butyllithium were injected and mixed for 1 minute under nitrogen stream. 0.88 g (3.7 mmol) of a compound represented by Formula 1-5 below was injected thereto, followed by stirring at 60° C. for 20 minutes to prepare a modified polymerization initiator. The modified polymerization initiator thus prepared was a mixture in which isomer compounds represented by Formulae (xiv) to (xvii) coexisted. The synthesis of the modified polymerization initiator thus prepared was secured by the change of the molecular weights of the compound represented by Formula 1-5 and the finally obtained material by molecular analysis. The molecular weight of the compound represented by Formula 1-5 was 234 g/mol, and the molecular weight of the finally obtained material, i.e., the modified polymerization initiator was 292 g/mol. In this case, the molecular weight of the modified polymerization initiator represented the molecular weight obtained by substituting Li with H, and the molecular weight analysis was conducted by the same method as in Example 1.

[Formula 1-5]

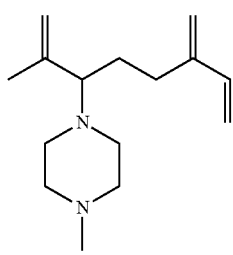

-continued (xiv)

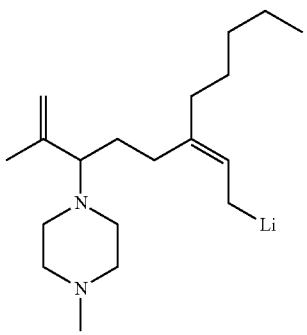

(xv)

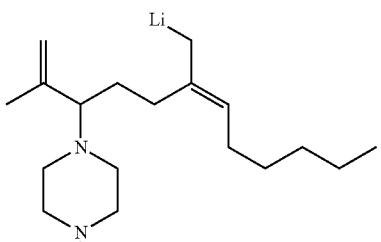

(xvi)

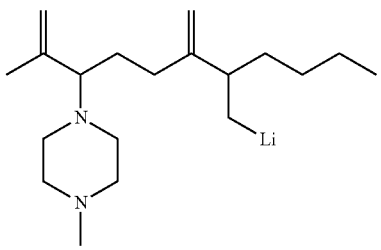

(xvii)

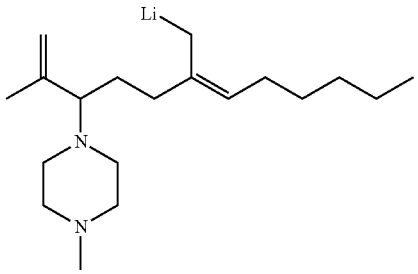

Example 5

To a vacuum dried batch type reactor, 15 ml of hexane, 1.2 ml (5.6 mmol) of tetramethylethylenediamine, and 1.5 ml (3.7 mmol) of 2.5 M n-butyllithium were injected and mixed for 1 minute under nitrogen stream. 1.19 g (3.7 mmol) of a compound represented by Formula 1-11 below was injected thereto, followed by stirring at 30° C. for 20 minutes to prepare a modified polymerization initiator. The modified polymerization initiator thus prepared was a mixture in which isomer compounds represented by Formulae (xviii) to (xx) coexisted. The synthesis of the modified polymerization initiator thus prepared was secured by the change of the molecular weights of the compound represented by Formula 1-11 and the finally obtained material by molecular analysis. The molecular weight of the compound represented by Formula 1-11 was 321 g/mol, and the molecular weight of the finally obtained material, i.e., the modified polymerization initiator was 378 g/mol. In this case, the molecular weight of the modified polymerization initiator represented the molecular weight obtained by substituting Li with H, and the molecular weight analysis was conducted by the same method as in Example 1.

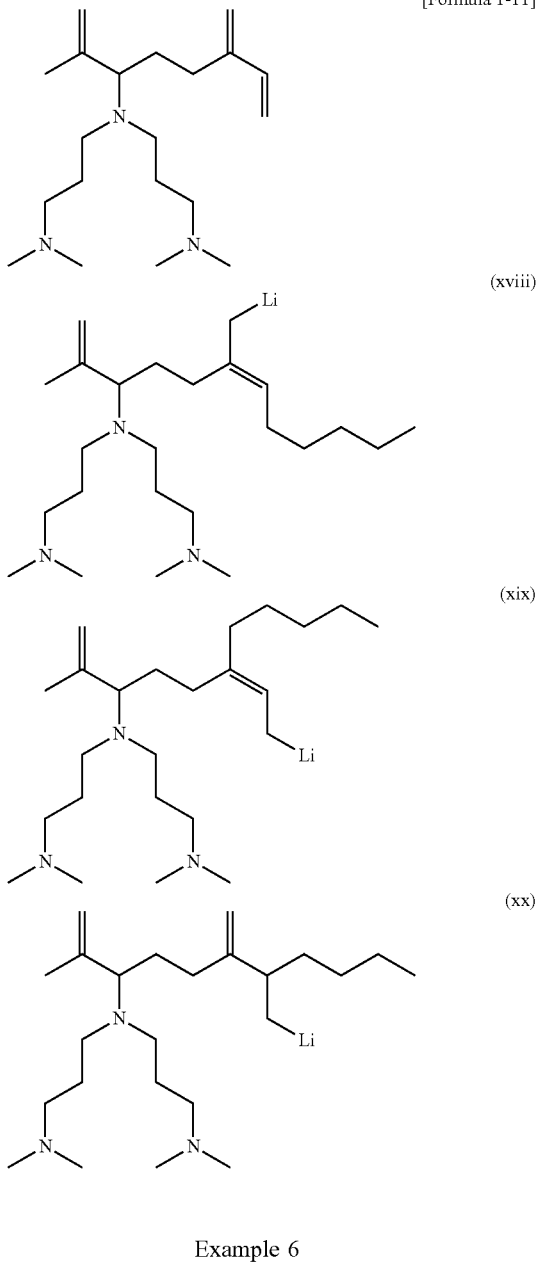

Example 6

To a vacuum dried batch type reactor, 15 ml of hexane, 1.2 ml (5.6 mmol) of tetramethylethylenediamine, and 1.5 ml (3.7 mmol) of 2.5 M n-butyllithium were injected and mixed for 1 minute under nitrogen stream. 0.88 g (3.7 mmol) of a compound represented by Formula 1-7 below was injected thereto, followed by stirring at 20° C. for 10 minutes to prepare a modified polymerization initiator. The modified polymerization initiator thus prepared was a mixture in which isomer compounds represented by Formulae (xxi) to (xxiii) coexisted. The synthesis of the modified polymerization initiator thus prepared was secured by the change of the molecular weights of the compound represented by Formula 1-7 and the finally obtained material by molecular analysis. The molecular weight of the compound represented by Formula 1-7 was 237 g/mol, and the molecular weight of the finally obtained material, i.e., the modified polymerization initiator was 295 g/mol. In this case, the molecular weight of the modified polymerization initiator represented the molecular weight obtained by substituting Li with H, and the molecular weight analysis was conducted by the same method as in Example 1.

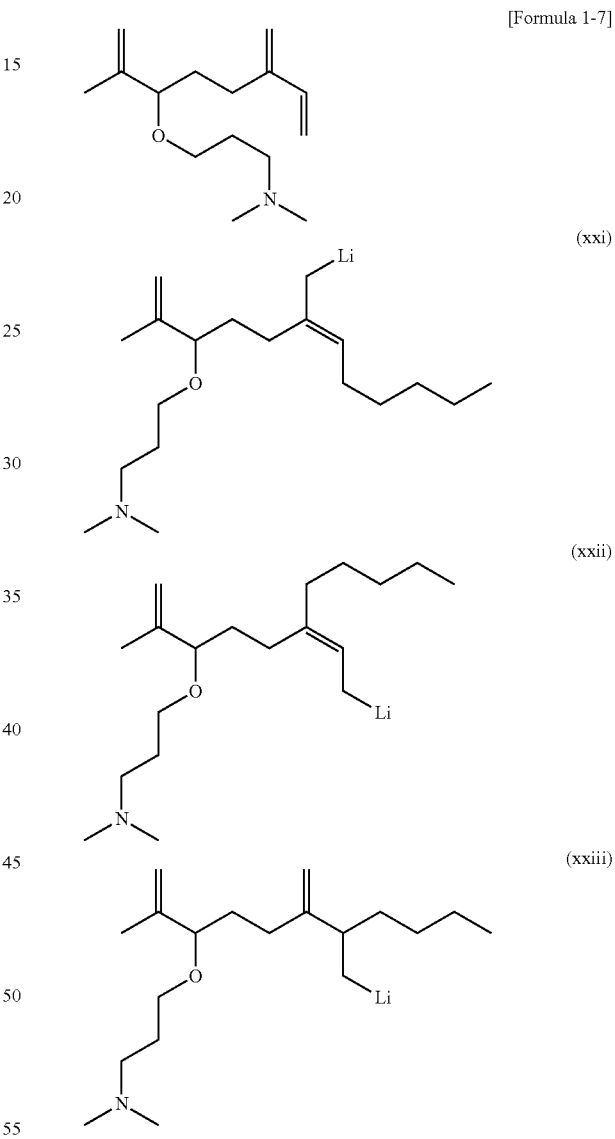

Examples 7 to 12

A modified conjugated diene-based polymer having a functional group derived from the modified polymerization initiator was prepared using each modified polymerization initiator prepared in Examples 1 to Example 6.

Particularly, to a 20 L autoclave reactor, in the presence of each modified polymerization initiator prepared in Example 1 to Example 6, 21 g of styrene, 58 g of 1,3-butadiene, 581 g of anhydrous n-hexane were added, and polymerization was performed while elevating the temperature from 50° C. to 80° C. until a polymerization conversion ratio reached 99%. Then, 1,3-butadiene was injected for capping the terminal of a polymer, and 14 g of a solution in which 30 wt % of Wingstay K antioxidant was dissolved in hexane was added thereto. The polymer thus obtained was added to hot water heated using steam and stirred to remove solvents, followed by roll drying to remove remaining solvents and water to prepare a modified styrene-butadiene copolymer.

Elemental analysis was conducted for each copolymer thus prepared, and the presence of a nitrogen atom in a copolymer chain was secured.

The invention claimed is:

1. A modified polymerization initiator comprising: one or more units derived from a compound represented by the following Formula 1, and a unit derived from a compound represented by the following Formula 2:

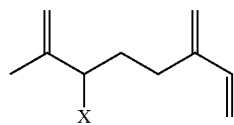

[Formula 1]

in Formula 1,

X is $-NR_aR_b$, $-OR_c$, or $-SR_d$, and $R_a$ to $R_d$ are each independently an alkyl group of 1 to 30 carbon atoms, an alkenyl group of 2 to 30 carbon atoms, an alkynyl group of 2 to 30 carbon atoms, a cycloalkyl group of 3 to 30 carbon atoms, an aryl group of 6 to 30 carbon atoms, a heteroalkyl group of 1 to 30 carbon atoms, a heteroalkenyl group of 2 to 30 carbon atoms, a heteroalkynyl group of 2 to 30 carbon atoms, a heterocycloalkyl group of 2 to 30 carbon atoms, or a heteroaryl group of 3 to 30 carbon atoms, where each of $R_a$ to $R_d$ is unsubstituted or substituted with a substituent comprising one or more heteroatoms selected from N, O, S, Si and F atoms, and $R_a$ and $R_b$ may be connected with each other to form an aliphatic hydrocarbon ring of 5 to 20 carbon atoms, an aromatic hydrocarbon ring of 6 to 20 carbon atoms, or a heterocycle of 3 to 20 carbon atoms, which are unsubstituted or substituted with an alkyl group of 1 to 30 carbon atoms, M-$R_1$  [Formula 2]

in Formula 2,

M is an alkali metal, and $R_1$ is hydrogen, an alkyl group of 1 to 30 carbon atoms, an alkenyl group of 2 to 30 carbon atoms, an alkynyl group of 2 to 30 carbon atoms, a cycloalkyl group of 5 to 30 carbon atoms, or an aryl group of 6 to 30 carbon atoms.

2. The modified polymerization initiator of claim 1, wherein in Formula 1,

X is $-NR_aR_b$, $-OR_c$, or $-SR_d$, and $R_a$ to $R_d$ are each independently an alkyl group of 1 to 20 carbon atoms, an alkenyl group of 2 to 20 carbon atoms, an alkynyl group of 2 to 20 carbon atoms, a cycloalkyl group of 3 to 20 carbon atoms, an aryl group of 6 to 20 carbon atoms, a heteroalkyl group of 1 to 20 carbon atoms, a heteroalkenyl group of 2 to 20 carbon atoms, a heteroalkynyl group of 2 to 20 carbon atoms, a heterocycloalkyl group of 2 to 20 carbon atoms, or a heteroaryl group of 3 to 20 carbon atoms, where each of $R_a$ to $R_d$ is unsubstituted or substituted with a substituent comprising one or more heteroatoms selected from N, O, S, Si and F atoms, and $R_a$ and $R_b$ may be connected with each other to form an aliphatic hydrocarbon ring of 5 to 20 carbon atoms, an aromatic hydrocarbon ring of 6 to 20 carbon atoms, or a heterocycle of 3 to 20 carbon atoms, which are unsubstituted or substituted with an alkyl group of 1 to 20 carbon atoms, and in Formula 2, $R_1$ is hydrogen, an alkyl group of 1 to 10 carbon atoms, an alkenyl group of 2 to 10 carbon atoms, an alkynyl group of 2 to 10 carbon atoms, a cycloalkyl group of 5 to 10 carbon atoms, or an aryl group of 6 to 10 carbon atoms.

3. The modified polymerization initiator of claim 1, wherein in Formula 1,

X is selected from substituents represented by the following Formula 1a to Formula 1c:

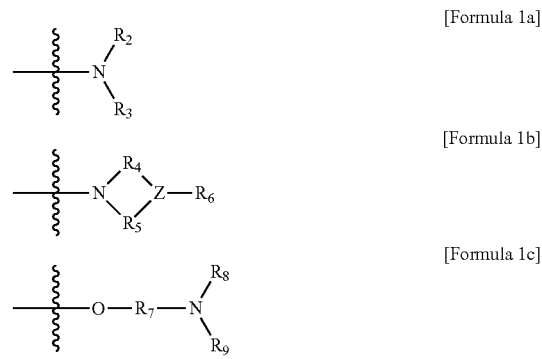

in Formula 1a to Formula 1c, $R_2$, $R_3$, $R_6$, $R_8$ and $R_9$ are each independently an alkyl group of 1 to 10 carbon atoms, an alkenyl group of 2 to 10 carbon atoms, an alkynyl group of 2 to 10 carbon atoms, a cycloalkyl group of 3 to 10 carbon atoms, an aryl group of 6 to 10 carbon atoms, a heteroalkyl group of 1 to 10 carbon atoms, a heteroalkenyl group of 2 to 10 carbon atoms, a heteroalkynyl group of 2 to 10 carbon atoms, a heterocycloalkyl group of 3 to 10 carbon atoms, or a heteroaryl group of 3 to 10 carbon atoms, where $R_2$ and $R_3$, and $R_8$ and $R_9$ each may be connected with each other to form an aliphatic hydrocarbon ring of 5 to 20 carbon atoms, or an aromatic hydrocarbon ring of 6 to 20 carbon atoms, and each of $R_2$, $R_3$, $R_6$, $R_8$ and $R_9$ is unsubstituted or substituted with a substituent comprising one or more heteroatoms selected from N, O and S atoms, $R_4$, $R_5$ and $R_7$ are each independently an alkylene group of 1 to 10 carbon atoms, the alkylene group being unsubstituted or substituted with an alkyl group of 1 to 10 carbon atoms, a cycloalkyl group of 5 to 10 carbon atoms, an aryl group of 6 to 10 carbon atoms, a heteroatom selected from N and O atoms or a substituent comprising the heteroatom, and Z is one selected from N, O and S atoms, where if Z is O or S, $R_6$ is not present.

4. The modified polymerization initiator of claim 1, wherein the modified polymerization initiator comprises one or more selected from the group consisting of a compound represented by the following Formula 3 and the isomers thereof:

[Formula 3]

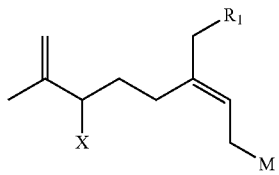

in Formula 3,

X is the same as defined in Formula 1,

M is Na, K or Li, and $R_1$ is hydrogen or an alkyl group of 1 to 10 carbon atoms.

5. The modified polymerization initiator of claim 4, wherein the isomer is one or more selected from compounds represented in the following Formula 3-1 to Formula 3-3:

[Formula 3-1]

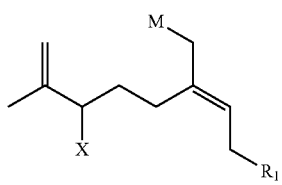

[Formula 3-2]

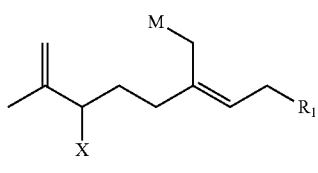

[Formula 3-3]

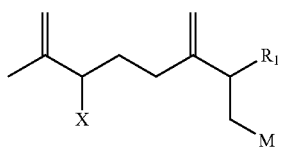

in Formula 3-1 to Formula 3-3,

X is the same as defined in Formula 1,

M is Na, K or Li, and $R_1$ is hydrogen or an alkyl group of 1 to 10 carbon atoms.

6. The modified polymerization initiator of claim 1, wherein the initiator comprises one or more selected from a dimer, a trimer and an oligomer of each of a compound represented by the following Formula 3 and the isomers thereof:

[Formula 3]

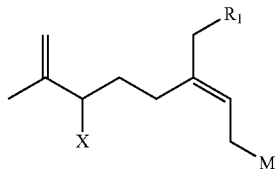

in Formula 3,

X is the same as defined in Formula 1,

M is Na, K or Li, and $R_1$ is hydrogen or an alkyl group of 1 to 10 carbon atoms.

7. A modified conjugated diene-based polymer comprising a repeating unit derived from a conjugated diene-based monomer and a functional group derived from the modified polymerization initiator of claim 1 in at least one terminal, the modified polymerization initiator comprising one or more units derived from a compound represented by the following Formula 1 and a unit derived from a compound represented by the following Formula 2:

[Formula 1]

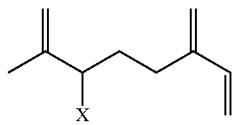

in Formula 1,

X is $-NR_aR_b$, $-OR_c$, or $-SR_d$, and $R_a$ to $R_d$ are each independently an alkyl group of 1 to 30 carbon atoms, an alkenyl group of 2 to 30 carbon atoms, an alkynyl group of 2 to 30 carbon atoms, a cycloalkyl group of 3 to 30 carbon atoms, an aryl group of 6 to 30 carbon atoms, a heteroalkyl group of 1 to 30 carbon atoms, a heteroalkenyl group of 2 to 30 carbon atoms, a heteroalkynyl group of 2 to 30 carbon atoms, a heterocycloalkyl group of 2 to 30 carbon atoms, or a heteroaryl group of 3 to 30 carbon atoms, where each of $R_a$ to $R_d$ is unsubstituted or substituted with a substituent comprising one or more heteroatoms selected from N, O, S, Si and F atoms, and $R_a$ and $R_b$ may be connected with each other to form an aliphatic hydrocarbon ring of 5 to 20 carbon atoms, an aromatic hydrocarbon ring of 6 to 20 carbon atoms, or a heterocycle of 3 to 20 carbon atoms, which are unsubstituted or substituted with an alkyl group of 1 to 30 carbon atoms, M-$R_1$ [Formula 2]

in Formula 2,

M is an alkali metal, and $R_1$ is hydrogen, an alkyl group of 1 to 30 carbon atoms, an alkenyl group of 2 to 30 carbon atoms, an alkynyl group of 2 to 30 carbon atoms, a cycloalkyl group of 5 to 30 carbon atoms, or an aryl group of 6 to 30 carbon atoms.

* * * * *